United States Patent
Woo

(10) Patent No.: US 11,433,496 B2
(45) Date of Patent: Sep. 6, 2022

(54) DEVICE FOR ATTACHING AND DETACHING TOOL IN MAGAZINE

(71) Applicant: DOOSAN MACHINE TOOLS CO., LTD., Changwon-si (KR)

(72) Inventor: Jingeun Woo, Changwon-si (KR)

(73) Assignee: DOOSAN MACHINE TOOLS CO., LTD., Changwon-si (KR)

(*) Notice: Subject to any disclaimer, the term of this patent is extended or adjusted under 35 U.S.C. 154(b) by 51 days.

(21) Appl. No.: 16/764,297

(22) PCT Filed: Oct. 29, 2018

(86) PCT No.: PCT/KR2018/012890
§ 371 (c)(1),
(2) Date: May 14, 2020

(87) PCT Pub. No.: WO2019/098565
PCT Pub. Date: May 23, 2019

(65) Prior Publication Data
US 2020/0361045 A1   Nov. 19, 2020

(30) Foreign Application Priority Data

Nov. 20, 2017 (KR) .................. 10-2017-0154627

(51) Int. Cl.
*B23Q 3/157* (2006.01)
*B23Q 3/155* (2006.01)

(52) U.S. Cl.
CPC ....... *B23Q 3/15553* (2013.01); *B23Q 3/1554* (2013.01); *B23Q 3/15533* (2013.01);
(Continued)

(58) Field of Classification Search
CPC ... Y10T 483/18–1818; Y10T 483/1864–1891; B23Q 3/15553;
(Continued)

(56) References Cited

U.S. PATENT DOCUMENTS 3,200,492 A * 8/1965 Lehmkuhl .......... B23Q 3/15766
483/37
4,799,308 A * 1/1989 Kitamura ............. B23Q 3/1554
483/41
(Continued)

FOREIGN PATENT DOCUMENTS

| CN | 108297071 A * | 7/2018 | .......... B25J 15/0213 |
| EP | 2551052 A1 * | 1/2013 | .......... B23Q 3/1554 |

(Continued)

OTHER PUBLICATIONS

International Search Report of PCT/KR2018/012890, dated Jan. 29, 2019, English translation.

*Primary Examiner* — Erica E Cadugan
*Assistant Examiner* — Michael Vitale
(74) *Attorney, Agent, or Firm* — STIP Law Group, LLC

(57) ABSTRACT

The present disclosure relates to a device for attaching and detaching tools in a magazine, and more particularly, to a device for attaching and detaching tools in a magazine of a machine tool, the device being capable of attaching or detaching a tool having directionality to or from each gripper of the magazine of the machine tool while accurately adjusting a fixed position of the tool.

5 Claims, 8 Drawing Sheets

(52) U.S. Cl.
CPC ...... *B23Q 3/15539* (2016.11); *B23Q 3/15722* (2016.11); *B23Q 2003/15527* (2016.11); *B23Q 2003/155418* (2016.11); *B23Q 2003/155428* (2016.11); *Y10T 483/13* (2015.01); *Y10T 483/1809* (2015.01); *Y10T 483/1882* (2015.01)

(58) Field of Classification Search
CPC ........ B23Q 3/1554; B23Q 2003/15527; B23Q 3/15722–15766; B23Q 3/15533; Y10S 483/902; B25J 15/0213; B65G 47/847
USPC ............... 483/36–46, 58–60, 65–68, 902
See application file for complete search history.

(56) References Cited

U.S. PATENT DOCUMENTS 4,845,834 A * 7/1989 Watson ................. B25J 15/103
483/31

9,005,092 B2 * 4/2015 Kim ................... B23Q 3/15553
483/68

FOREIGN PATENT DOCUMENTS

| | | | | |
|---|---|---|---|---|
| JP | 52103082 A | * | 8/1977 | ........... B23Q 3/1554 |
| JP | 59-214534 A | * | 12/1984 | ............. B23Q 3/155 |
| JP | 59214534 A | * | 12/1984 | ........... B23Q 3/1554 |
| JP | 60228045 A | * | 11/1985 | ........... B23Q 3/1554 |
| JP | 01228749 A | * | 9/1989 | ........... B23Q 3/1554 |
| JP | 6173804 B2 | | 8/2017 | |
| JP | 6182413 B2 | | 8/2017 | |
| KR | 100655316 B1 | | 12/2006 | |
| KR | 101398752 B1 | | 5/2014 | |
| KR | 101612128 B1 | | 4/2016 | |
| WO | WO-9104131 A1 | * | 4/1991 | ......... B23Q 3/15793 |

* cited by examiner

[Fig. 1]
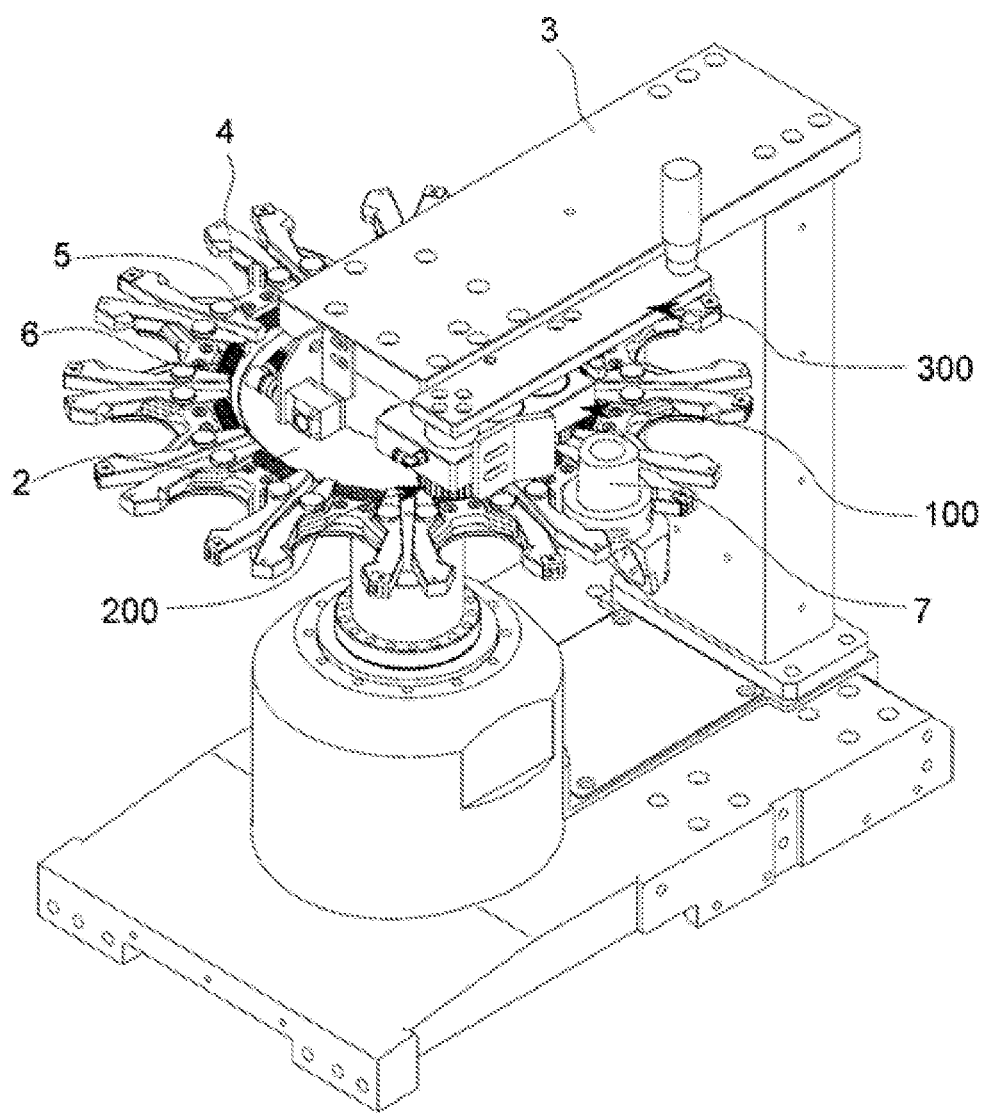

[Fig. 2]
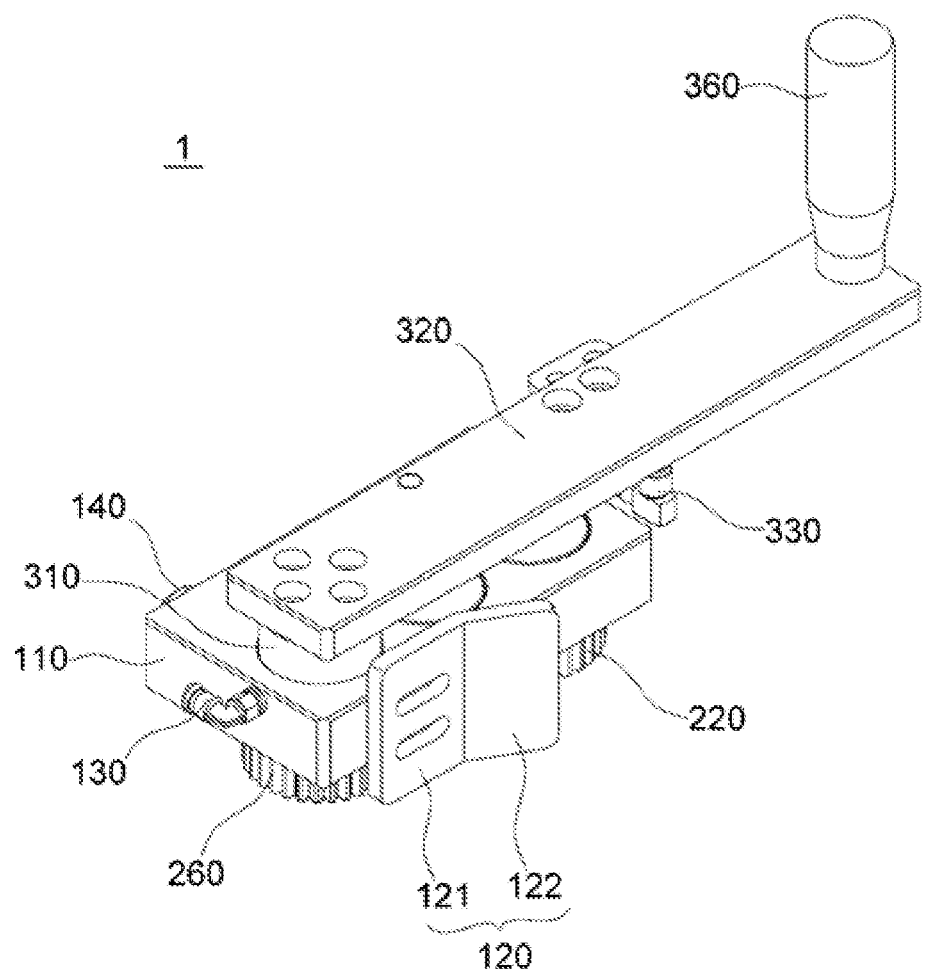

[Fig. 3]
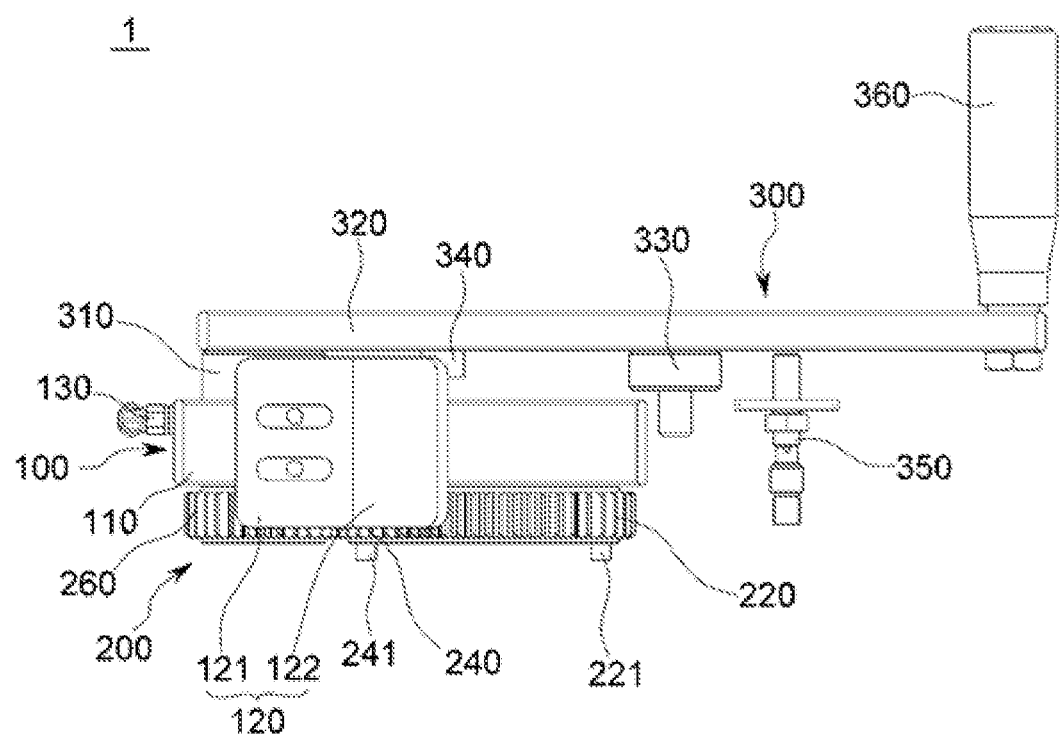

[Fig. 4]
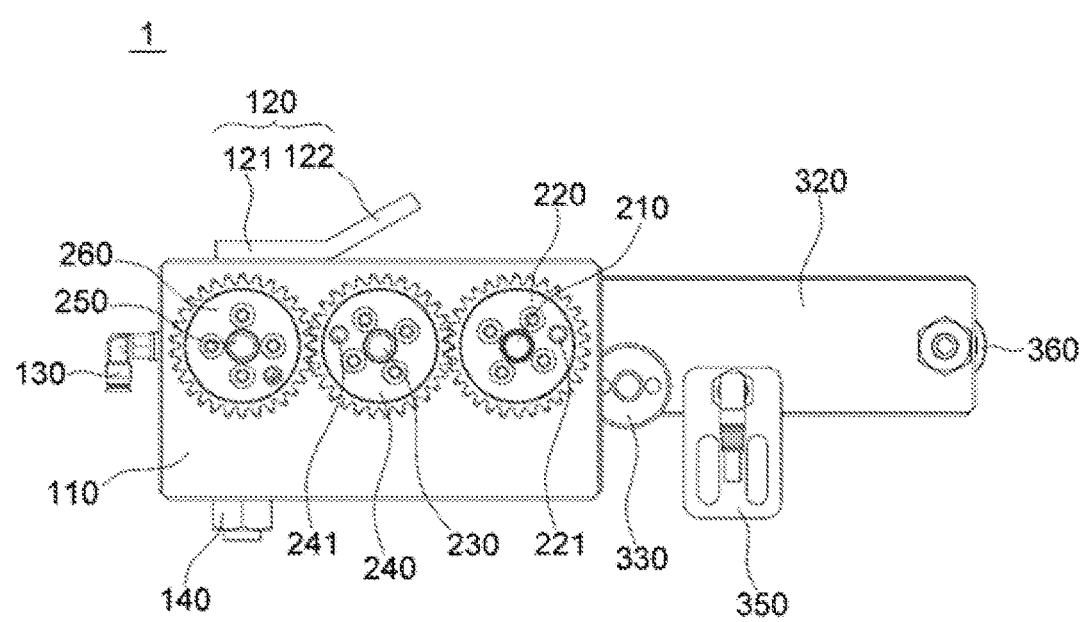

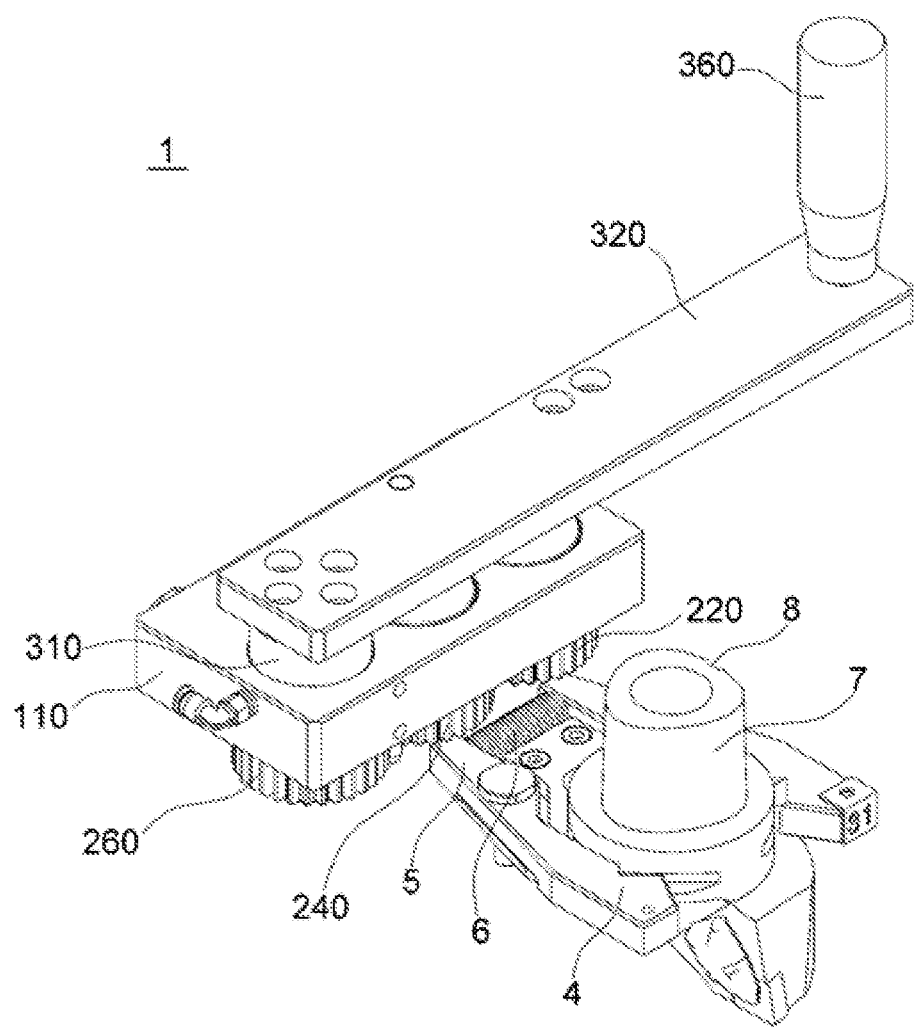
[Fig. 5]

[Fig. 6]
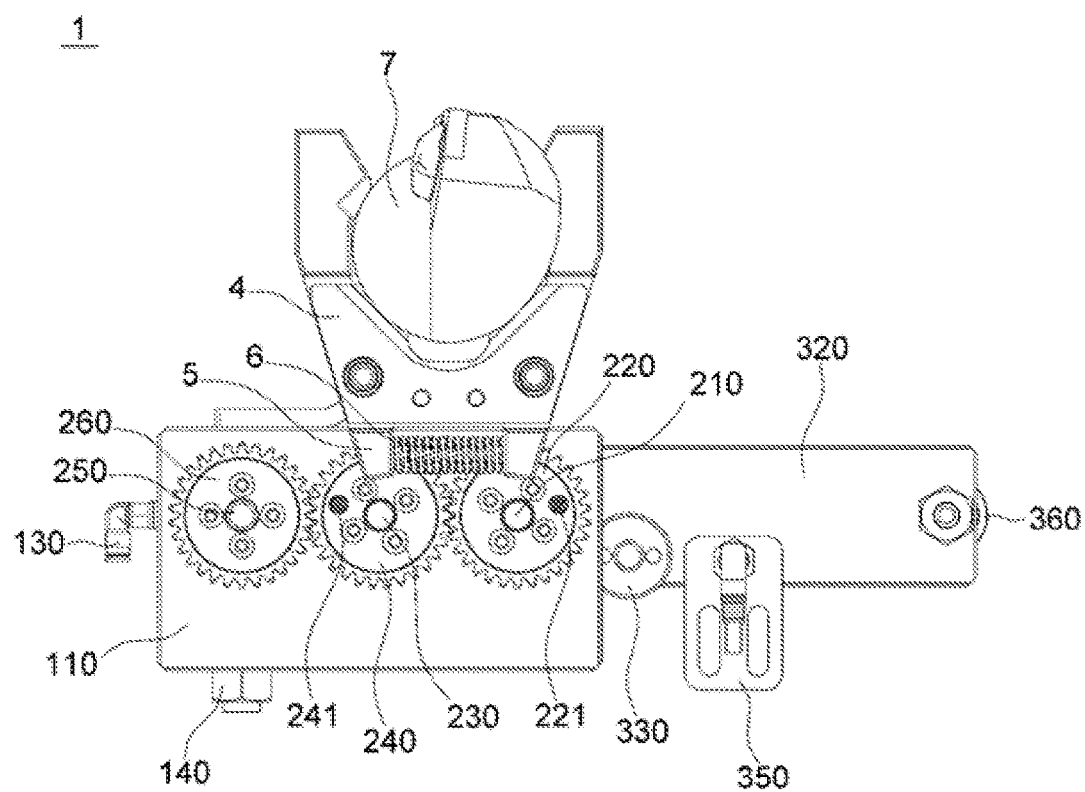

[Fig. 7]
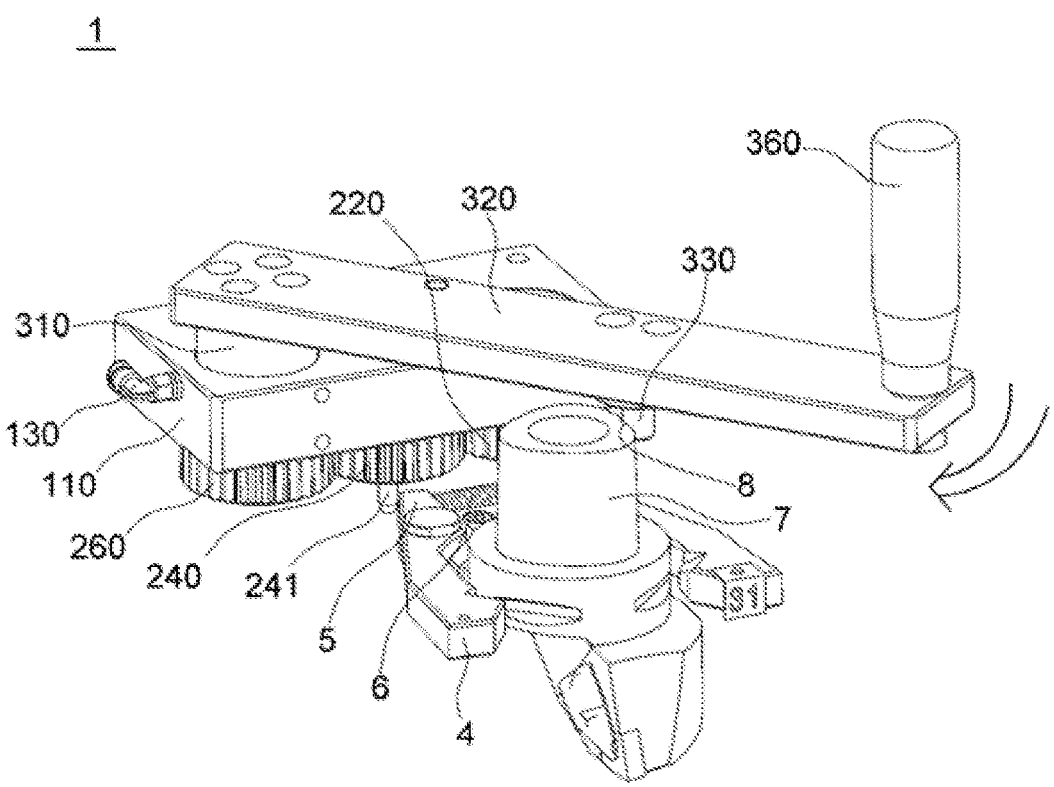

[Fig. 8]
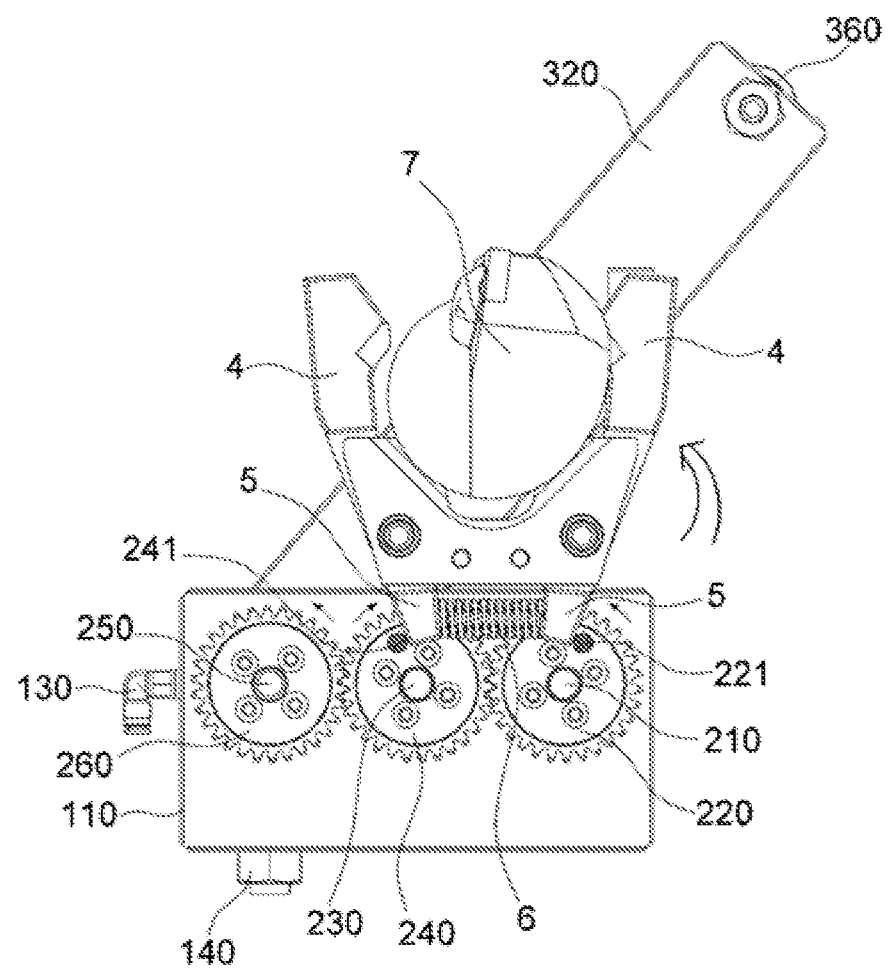

DEVICE FOR ATTACHING AND DETACHING TOOL IN MAGAZINE

CROSS-REFERENCE TO RELATED APPLICATIONS

This application is the U.S. National Phase under 35 U.S.C. § 371 of International Application No. PCT/KR2018/012890 filed on Oct. 29, 2018, which in turn claims the benefit of Korean Application No. 10-2017-0154627, filed on Nov. 20, 2017, the disclosures of which are incorporated by reference into the present application.

FIELD OF THE DISCLOSURE

The present disclosure relates to a device for attaching and detaching tools in a magazine, and more particularly, to a device for attaching and detaching tools in a magazine of a machine tool, the device being capable of attaching or detaching a tool having directionality to or from each gripper of the magazine of the machine tool while accurately adjusting a fixed position of the tool.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe and a multi-tasking machining center are being widely used in various industrial sites to suit the purpose of the corresponding work.

The multi-tasking machining center, among the machine tools, refers to a turning center equipped with a multifunctional automatic tool changer (ATC) and a tool magazine in order to perform various types of processing such as turning machining, drilling, tapping, or milling. In the case of the multi-tasking machining center, an operator manually mounts a tool on a tool magazine when loading the tool required for machining or changing the tools.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during machining.

In general, the machine tool is provided with a transfer unit configured to transfer the table, a tool post, the main shaft, the tailstock, and the steady rest along a transfer shaft in order to perform various types of machining.

In general, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In general, the machine tool is equipped with the automatic tool changer (ATC) configured to withdraw a specific tool from the tool magazine or remount the tool on the tool magazine based on an instruction of a numerical control unit in order to improve productivity of the machine tool.

In general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

In general, the tool magazine of the machine tool is provided with a gripper installed at one side of a chain, the chain is installed between a driving sprocket and an idle sprocket, and the chain moves as the driving sprocket operates.

In the related art, a tool having directionality is not mounted on the gripper of the tool magazine of the machine tool in a state wherein a fixed position of the tool is accurately determined. For this reason, there is a problem in that the tool or a workpiece is damaged during the operation of the machine tool, which causes an increase in processing costs and a deterioration in precision when machining the workpiece.

In addition, the device for attaching and detaching tools in a magazine in the related art merely attaches or detaches a tool to or from the gripper of the magazine and cannot quickly determine directionality of the tool. Thus, an operator needs to carefully adjust the directionality of the tool while holding the tool with one hand in order to manually attach or detach the tool to or from the magazine, which causes an increase in time taken to attach or detach the tool and causes an increase in non-processing time. For this reason, there is a problem in that productivity of the machine tool deteriorates.

Moreover, in the case of the device for attaching and detaching tools in a magazine in the related art, the heavy tool, which is a heavy item, may be dropped or withdrawn while the operator attaches or detaches the tool to or from the gripper while adjusting the directionality of the relatively heavy tool. For this reason, there are problems in that a safety accident to the operator occurs and thus impairs the operator's safety. If a set of two or more operators performs work together in order to prevent the problem, an increase in costs and inconvenience of the operators.

Furthermore, the device for attaching and detaching tools in a magazine in the related art cannot be miniaturized because the device uses a cam. For this reason, there is a problem in that the large size of the device results in a great limitation in terms of an installation space for the device. In addition, because such a device cannot be installed in various machine tools, there is a problem in that a distribution rate of the device is reduced. Further, because of the large size of the device, there is a problem in that working time and manufacturing costs increase, and a distance between an operating mechanism and a power transmission mechanism of the device is increased, which causes a deterioration in safety and durability during the operation of the device.

DISCLOSURE

Summary

The present disclosure has been made in an effort to solve the above-mentioned problems, and an object of the present disclosure is to provide a device for attaching and detaching tools in a magazine, wherein a fixed position of a tool having directionality is accurately adjusted with respect to the magazine of the machine tool and then the tool is easily attached to or detached from each of the grippers of the magazine, by operations of first and second gears of a driving unit and a turning operation of a base of a manipulation unit, and as a result, it is possible to improve productivity and precision when machining a workpiece, reduce maintenance costs by preventing damage to the workpiece or the tool, improve rigidity and durability by decreasing a clearance and minimizing a length of the base by the configuration wherein the gears of the driving unit are operated, make it easy to mount the device on magazines of various machine tools because of reduction in size of the device, improve an operator's safety and convenience, and improve reliability and safety of the machine tool because of a stable operation thereof. In order to achieve the object of the present disclosure, a device for attaching and detaching tools in a magazine according to the present disclosure includes: a housing unit having a plurality of grippers configured to clamp a tool by pressing fingers, the housing unit having a main body part installed on a support frame of the magazine; a driving unit rotatably installed on the main body part and configured to apply pressure to the fingers of the gripper or release the fingers; and a manipulation unit turnably installed on the main body part and configured to provide rotational power to the driving unit, wherein the device is capable of adjusting a fixed position of the tool to be clamped by the gripper, while attaching or detaching the tool to or from the gripper by turning the manipulation unit.

In addition, according to another exemplary embodiment of the device for attaching and detaching tools in a magazine according to the present disclosure, the driving unit of the device for attaching and detaching tools in a magazine may include: a first rotary shaft installed to be coupled to a part of the main body part; a first gear installed on the first rotary shaft and configured to rotate in a direction equal to a direction wherein the manipulation unit is turned; a second rotary shaft installed on a part of the main body part so as to be in parallel with and spaced apart from the first rotary shaft; and a second gear installed on the second rotary shaft and configured to engage with the first gear and rotate in a direction opposite to the direction wherein the first gear rotates.

In addition, according to another exemplary embodiment of the device for attaching and detaching tools in a magazine according to the present disclosure, the first gear of the device for attaching and detaching tools in a magazine may include a first pressing portion provided at a lower portion of the first gear and configured to press the finger of the gripper, and the second gear may include a second pressing portion provided at a lower portion of the second gear and configured to press the fingers of the gripper in conjunction with the first pressing portion.

In addition, according to another exemplary embodiment of the device for attaching and detaching tools in a magazine according to the present disclosure, the driving unit of the device for attaching and detaching tools in a magazine may further include: a third rotary shaft installed on a part of the main body part so as to be in parallel with and spaced apart from the first rotary shaft and the second rotary shaft; and a third gear installed on the third rotary shaft and configured to engage with the second gear and rotate in a direction opposite to the direction wherein the second gear rotates.

In addition, according to another exemplary embodiment of the device for attaching and detaching tools in a magazine according to the present disclosure, the manipulation unit of the device for attaching and detaching tools in a magazine may include: a connecting part connected to the first rotary shaft or the third rotary shaft; a base installed to be coupled to the connecting part; a positioning part provided at a lower portion of the base and configured to adjust a fixed position of the tool to be clamped by the gripper; and a catching part provided at the lower portion of the base so as to be spaced apart from the positioning part and configured to restrict a turning angle of the base.

In addition, according to another exemplary embodiment of the device for attaching and detaching tools in a magazine according to the present disclosure, the manipulation unit of the device for attaching and detaching tools in a magazine may further include a detection part configured to detect whether the base is turned.

In addition, according to another exemplary embodiment of the device for attaching and detaching tools in a magazine according to the present disclosure, the housing unit of the device for attaching and detaching tools in a magazine may include a stopper installed at one side of the main body part and configured to restrict the turning angle of the base by coming into contact with the catching part when the base is turned.

In addition, according to another exemplary embodiment of the device for attaching and detaching tools in a magazine according to the present disclosure, the stopper of the device for attaching and detaching tools in a magazine may include: a coupling portion coupled to one side of the main body part; and a bent portion extending from one end of the coupling portion so as to be bent in a direction wherein the base is turned.

According to the device for attaching and detaching tools in a magazine according to the present disclosure, the fixed position of the tool having directionality is accurately adjusted with respect to the magazine of the machine tool, and then the tool is easily attached to or detached from each of the grippers of the magazine, by the operations of the first and second gears of the driving unit and the turning operation of the base of the manipulation unit. As a result, it is possible to improve precision when machining the workpiece, quickly adjust the fixed position of the tool, minimize the non-processing time, and improve productivity of the machine tool.

In addition, according to the device for attaching and detaching tools in a magazine according to the present disclosure, the fixed position of the tool having directionality is accurately adjusted with respect to the magazine of the machine tool and then the tool is attached to or detached from the gripper, such that it is possible to prevent the tool from being placed at an incorrect tool position and thus to prevent the workpiece or the tool from being damaged during the machining. As a result, it is possible to reduce costs required to maintain the machine tool and maximize reliability and stability of the machine tool.

Further, according to the device for attaching and detaching tools in a magazine according to the present disclosure, a clearance may be decreased and a length of the base may be minimized by the configuration wherein the gears of the driving unit are operated, thereby improving rigidity and durability.

Furthermore, according to the device for attaching and detaching tools in a magazine according to the present disclosure, it is possible to make it easy to mount the device on magazines of various machine tools because of the reduction in size of the device, improve a distribution rate of the device, and maximize safety and convenience of operators.

DESCRIPTION OF THE DRAWINGS

FIG. 1 is a perspective view illustrating a magazine of a machine tool in a state wherein a device for attaching and detaching tools in a magazine according to an exemplary embodiment of the present disclosure is installed.

FIG. 2 is a perspective view illustrating the device for attaching and detaching tools in a magazine according to the exemplary embodiment of the present disclosure.

FIG. 3 is a front view illustrating the device for attaching and detaching tools in a magazine according to the exemplary embodiment of the present disclosure.

FIG. 4 is a bottom plan view illustrating the device for attaching and detaching tools in a magazine according to the exemplary embodiment of the present disclosure.

FIG. 5 is a perspective view illustrating a state before the device for attaching and detaching tools in a magazine according to the exemplary embodiment of the present disclosure is turned.

FIG. 6 is a bottom plan view of FIG. 5.

FIG. 7 is a perspective view illustrating a state after the device for attaching and detaching tools in a magazine according to the exemplary embodiment of the present disclosure is turned.

FIG. 8 is a bottom plan view of FIG. 7.

DESCRIPTION OF MAIN REFERENCE NUMERALS OF DRAWINGS

1: Device for attaching and detaching tools
2: Magazine
3: Support frame
4: Gripper
5: Fingers
6: Elastic member
7: Tool
8: Tool groove
100: Housing unit
110: Main body part
120: Stopper
121: Coupling portion
122: Bent portion
130: Oil supply part
140: Oil recovery part
200: Driving unit
210: First rotary shaft
220: First gear
221: First pressing portion
230: Second rotary shaft
240: Second gear
241: Second pressing portion
250: Third rotary shaft
260: Third gear
300: Manipulation unit
310: Connecting part
320: Base
330: Positioning part
340: Catching part
350: Detection part
360: Handle

DETAILED DESCRIPTION OF CERTAIN INVENTIVE EMBODIMENT

Hereinafter, a device for attaching and detaching tools in a magazine according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

FIG. 1 is a perspective view illustrating a magazine of a machine tool in a state wherein the device for attaching and detaching tools in a magazine according to an exemplary embodiment of the present disclosure is installed, and FIG. 2 is a perspective view illustrating the device for attaching and detaching tools in a magazine according to the exemplary embodiment of the present disclosure. FIG. 3 is a front view illustrating the device for attaching and detaching tools in a magazine according to the exemplary embodiment of the present disclosure, and FIG. 4 is a bottom plan view illustrating the device for attaching and detaching tools in a magazine according to the exemplary embodiment of the present disclosure. FIG. 5 is a perspective view illustrating a state before the device for attaching and detaching tools in a magazine according to the exemplary embodiment of the present disclosure is turned, and FIG. 6 is a bottom plan view of FIG. 5. FIG. 7 is a perspective view illustrating a state after the device for attaching and detaching tools in a magazine according to the exemplary embodiment of the present disclosure is turned, and FIG. 8 is a bottom plan view of FIG. 7.

The terms used below are defined as follows. The term "horizontal direction" means a horizontal direction in the same member, the term "vertical direction" means a vertical direction in the same member orthogonal to the horizontal direction, and the term "width direction" means a height direction in the same member orthogonal to the horizontal direction and the vertical direction.

A device 1 for attaching and detaching tools in a magazine according to an exemplary embodiment of the present disclosure will be described with reference to FIGS. 1 to 8. As illustrated in FIGS. 1 to 8, the device 1 for attaching and detaching tools in a magazine according to the exemplary embodiment of the present disclosure includes a housing unit 100, a driving unit 200, and a manipulation unit 300.

The device 1 for attaching and detaching tools in a magazine according to the present disclosure is mounted on and applied to a magazine having grippers 4 each configured to clamp a tool 7 by pressing fingers 5.

FIGS. 1 to 8 illustrate the gripper 4 that clamps the tool 7 by pressing the fingers 5 by using an elastic member 6, but the present disclosure is not necessarily limited thereto, and any pressing method may be applied as long as the pressing method clamps the tool by pressing the fingers.

In addition, the elastic member may be a spring. The gripper 4 is movably installed in the magazine.

The housing unit 100 has the plurality of grippers 4 that clamps the tools 7 by pressing the fingers 5, and the grippers 4 are installed in the magazine so as to be movable by a magazine driving unit.

The housing unit 100 has a main body part 110 installed on a support frame 3 of the magazine 2. In addition, as necessary, the housing unit 100 may be installed on another frame of the magazine 2. That is, the housing unit 100 is installed at a position at which the fingers of the gripper may be pressed. The gripper clamps the tool by pressing the fingers in accordance with the type and the shape of the magazine.

The housing unit 100 is provided with an oil supply part 130 and an oil recovery part 140 for supplying lubricating oil to first, second, and third gears 220, 240, and 260 of the driving unit 200 to be described below. Although not illustrated in the drawings, the oil supply part 130 and the oil recovery part 140 are connected to an oil tank with tubes, such that the oil may be circulated and recycled. Therefore, it is possible to reduce costs required to supply the oil, reduce maintenance costs by minimizing abrasion of and damage to the first, second, and third gears, and increase a lifespan of the device.

The main body part 110 defines an external shape of the device 1 for attaching and detaching tools in a magazine. The main body part 110 of the housing unit 100 is formed in the form of, but not necessarily limited to, a hexahedral frame having a cavity therein. However, the main body part 110 may be sized to receive the driving unit 200 to be described below. The main body part 110 is formed such that lengths thereof in a vertical direction and a width direction may be minimized. Therefore, the device 1 for attaching and detaching tools in a magazine may be miniaturized.

The driving unit 200 is rotatably installed on the main body part 110 and may apply pressure to the fingers 5 of the gripper 4 or release the fingers 5 of the gripper 4. That is, when a base 320 of the manipulation unit 300 to be described below is turned, a first pressing portion 221 formed on the first gear 220 of the driving unit 200 and a second pressing portion 241 formed on the second gear 240 of the driving unit 200 press the fingers 5 of the gripper 4 from opposite sides, such that the elastic member 6 is compressed, and the gripper 4 is opened, thereby finally unclamping the tool.

The manipulation unit 300 is turnably installed on the main body part 110 and provides rotational power to the driving unit 200.

Most tools, including a turning machining tool, needs to be positioned so that a tip of a tool tip is directed toward a workpiece.

According to the device 1 for attaching and detaching tools in a magazine according to the present disclosure, during the operation of attaching or detaching the tool to or from the gripper by turning the manipulation unit 300, a fixed position of the tool, which has directionality and is clamped to be clamped by the gripper, may be accurately adjusted to be directed toward the workpiece.

Therefore, according to the device for attaching and detaching tools in a magazine according to the present disclosure, the fixed position of the tool having directionality is accurately adjusted with respect to the magazine of the machine tool, and then the tool is easily attached to or detached from each of the grippers of the magazine, by the operations of the first and second gears of the driving unit and the turning operation of the base of the manipulation unit. As a result, it is possible to improve precision when machining the workpiece, quickly adjust the fixed position of the tool, minimize the non-processing time, and improve productivity of the machine tool.

As illustrated in FIGS. 1 to 8, the driving unit 200 of the device 1 for attaching and detaching tools in a magazine according to the exemplary embodiment of the present disclosure a first rotary shaft 210, the first gear 220, a second rotary shaft 230, and the second gear 240.

The first rotary shaft 210 is installed to be coupled to a part of the main body part 110. Particularly, the first rotary shaft 210 penetrates a part of one side of the main body part 110 and extends downward from the main body part 110.

The first gear 220 is installed to be fitted with the first rotary shaft 210 so as to be rotated in a direction equal to a direction wherein the manipulation unit 200, more particularly, the base 320 is turned. That is, the first gear 220 is installed to be fitted with the first rotary shaft 210 extending downward from the main body part 110, such that the first gear 220 is rotated together with the first rotary shaft 210 by the turning operation of the base 320 of the manipulation unit 300, and the first gear 220 rotates in the direction equal to the direction wherein the base 320 is turned.

The first pressing portion 221 protrudes downward from a lower portion of the first gear 220 in order to press, at one side, the finger 5 of the gripper 4.

The second rotary shaft 230 is installed at one side of the main body part 110 so as to be in parallel with and spaced apart from the first rotary shaft 210. Particularly, the second rotary shaft 230 penetrates a part of one side of the main body part 110 and extends downward from the main body part 110. The second rotary shaft 230 is in parallel with and spaced apart from the first rotary shaft 210.

The second gear 240 is installed on the second rotary shaft 230 and engages with the first gear 220 so that the second gear 240 rotates in a direction opposite to the direction wherein the first gear 220 rotates. That is, the second gear 240 is installed to be fitted with the second rotary shaft 230 extending downward from the main body part 110, such that the second gear 240 is rotated together with the second rotary shaft 230 by the turning operation of the base 320 of the manipulation unit 300, and the second gear 240 rotates in the direction opposite to the direction wherein the base 320 and the first gear 220 are turned.

The second pressing portion 241 protrudes from a lower portion of the second gear 240 in order to press, at the other side, the finger 5 of the gripper 4. That is, the second pressing portion 241, together and in conjunction with the first pressing portion 221, presses or releases the fingers 5 of the gripper 4 by the rotation of the first gear 220 in the direction equal to the turning direction of the base 320 and by the rotation of the second gear 240 in the direction opposite to the turning direction of the base 320, thereby allowing the gripper to clamp or unclamp the tool.

In accordance with the shape or the size of the magazine, the driving unit 200 includes the first rotary shaft 210, the second rotary shaft 230, the first gear 220, the second gear 240, the first pressing portion 221, and the second pressing portion 241. In this case, a connecting part 310 of the manipulation unit 300 is connected to the first rotary shaft 210.

As described above, according to the device for attaching and detaching tools in a magazine according to the present disclosure, a clearance may be decreased and a length of the base may be minimized by the configuration wherein the gears of the driving unit are operated, thereby improving rigidity and durability.

As illustrated in FIGS. 1 to 8, the driving unit 200 of the device 1 for attaching and detaching tools in a magazine according to the exemplary embodiment of the present disclosure may further include a third rotary shaft 250 and a third gear 260.

The third rotary shaft 250 is installed at one side of the main body part 110 so as to be in parallel with and spaced apart from the first rotary shaft 210 and the second rotary shaft 230. Particularly, the third rotary shaft 250 penetrates a part of one side of the main body part 110 and extends downward from the main body part 110, so as to be in parallel with and spaced apart from the first rotary shaft 210 and the second rotary shaft 230.

The third gear 260 is installed on the third rotary shaft 250 and engages with the second gear 240 so that the third gear 260 rotates in a direction opposite to the direction wherein the second gear 240 rotates. That is, the third gear 260 is installed to be fitted with the third rotary shaft 250 extending downward from the main body part 110, such that the third gear 260 is rotated together with the third rotary shaft 250 by the turning operation of the base 320 of the manipulation unit 300, and the third gear 260 rotates in the direction equal to the direction wherein the base 320 and first gear 220 are turned.

As described above, according to the device for attaching and detaching tools in a magazine according to the present disclosure, the three rotary shafts and the three gears are disposed in parallel with one another, the rotary shaft and the gear connected to the manipulation unit are rotated in the direction equal to the direction wherein the manipulation unit rotates, and another gear engaging with the above-mentioned gear and another rotary shaft are rotated in the direction opposite to the direction wherein the manipulation unit rotates. As a result, with the configuration wherein the gears are operated, it is possible to decrease a clearance, easily transmit power, improve durability and rigidity, make it easy to mount the device on magazines of various machine tools because of the reduction in size of the device, improve a distribution rate of the device, and maximize safety and convenience of operators.

As illustrated in FIGS. 1 to 8, the manipulation unit 300 of the device 1 for attaching and detaching tools in a magazine according to the exemplary embodiment of the present disclosure includes the connecting part 310, the base 320, a positioning part 330, and a catching part 340.

The connecting part 310 is connected to the first rotary shaft 210 or the third rotary shaft 250. That is, the turning operation of the base 320 to be described below is transmitted to the first rotary shaft 210 or the third rotary shaft 250 through the connecting part 310. In accordance with the size and the shape of the magazine, the connecting part 310 may be connected to the first rotary shaft 210 or the third rotary shaft 250. However, as illustrated in FIGS. 1 to 8, in the case wherein the connecting part 310 is connected to the third rotary shaft 250, the three rotary shafts, i.e., the first, second, and third rotary shafts 210, 230, and 250 and the three gears, i.e., the first, second, and third gears 220, 240, and 260 need to be installed and arranged on the main body part 110 so as to be in parallel with and spaced apart from one another. In this case, a length of the base 320 is determined, and an angle of the positioning part 330, an angle of the catching part 340, and an angle of a bent portion 122 of a stopper 120 are determined based on the length and a radius of rotation of the base 320 to be described below.

Although not illustrated in the drawings, in the case of the magazines having different shapes and different sizes, only the first and second rotary shafts 210 and 230 and only the first and second gears 220 and 240 may be installed and arranged on the main body part 110 in order to further decrease the size of the device and reduce manufacturing costs. In this case, the connecting part 310 is installed to be connected to the first rotary shaft 210. As described above, according to the device 1 for attaching and detaching tools in a magazine according to the present disclosure, the device may be optimally miniaturized in accordance with the size and the shape of the magazine, such that the ease of installation may be maximized and manufacturing costs may be reduced.

As a result, in the case wherein only the two rotary shafts and only the two gears are installed on the main body part 110, the connecting part 310 is connected to the first rotary shaft 210. In the case wherein the three rotary shafts and the three gears are installed on the main body part 110, the connecting part 310 is connected to the third rotary shaft 250. This is because a turning angle of the base 320 needs to be changed in accordance with the size and the shape of the magazine. In accordance with the size and the shape of the magazine, the four gears and the four rotary shafts may be provided as long as the turning angle of the base may be ensured and the first pressing portion and the second pressing portion may press, at both sides, the fingers of the gripper at the same time. However, as illustrated in the drawings, the gears need to be disposed in parallel with one another in order to miniaturize the device for attaching and detaching tools in a magazine.

The base 320 is installed to be coupled to the connecting part 310. As necessary, the base 320 may have a bracket shape and may be formed integrally with the connecting part 310, but the present disclosure is not necessarily limited thereto. The base 320 may have various lengths and various sizes in accordance with the size and the shape of the magazine.

The positioning part 330 is provided at a lower portion of the base 320 in order to adjust the fixed position of the tool 7 to be clamped by the gripper 4. That is, the positioning part 330 is provided on a lower surface of the base 320 so as to correspond to a position at which the positioning part 330 may be seated in a tool groove 8 of the tool 7 when the base 320 is turned.

According to the device for attaching and detaching tools in a magazine according to the present disclosure, the fixed position of the tool having directionality is accurately adjusted with respect to the magazine of the machine tool and then the tool is attached to or detached from the gripper, by the configuration wherein the gears are operated to attach or detach the tool, such that it is possible to prevent the tool from being placed at an incorrect tool position and thus to prevent the workpiece or the tool from being damaged during the machining. As a result, it is possible to reduce costs required to maintain the machine tool and maximize reliability and stability of the machine tool.

The catching part 340 is formed on the lower portion of the base 320 so as to be spaced apart from the positioning part 330 in order to restrict the turning angle of the base 320. That is, in order to prevent the base 320 from being turned excessively when the base 320 is turned, the catching part 340 protrudes from the lower surface of the base 320 so as to be spaced apart from the positioning part 330, and the catching part 340 is configured to come into contact with the bent portion 122 of the stopper 120 to be described below. Therefore, the catching part 340 is always caught by the bent portion 122 of the stopper 120 even when the base 320 is turned without the adjustment of the operator's effort. As a result, the base 320 is not turned by a predetermined turning angle or larger, such that it is possible to improve working safety and an operator's convenience and reduce working time.

As illustrated in FIGS. 3, 4, and 6, the manipulation unit 300 of the device 1 for attaching and detaching tools in a magazine according to the exemplary embodiment of the present disclosure further includes a detection part 350 and a handle 360.

The detection part 350 detects whether the base 320 is turned. That is, the detection part 350 detects whether the base 320 protrudes toward the tool by being turned. When the detection part 350 detects that the base 320 protrudes toward the tool, the magazine or the spindle is not operated to prevent the magazine or the device from being damaged and prevent a safety accident. The detection part 350 may be configured as, but not necessarily limited to, a proximity sensor or the like. FIGS. 3, 4, and 6 illustrate that the detection part 350 is installed on the main body part, but the present disclosure is not necessarily limited thereto. The detection part 350 may be installed at an optimum position on the base 320, the main body part 110, or the support frame 2, at which whether the base 320 is turned may be detected.

The handle 360 protrudes from one side tip of the base 320 in a direction opposite to the direction wherein the connecting part 310 installed on the base 320 protrudes. Therefore, in order to turn the base 320 or return the base 320 to the original position, the operator may hold the handle 360 and then turn the base 320 without applying a great effort, and as a result, it is possible to reduce the operator's fatigue from the operator's repeated motion and maximize the operator's convenience.

As illustrated in FIGS. 1 to 4, the housing unit 100 of the device 1 for attaching and detaching tools in a magazine according to the exemplary embodiment of the present disclosure includes the stopper 120.

The stopper 120 is installed at one side of the main body part 110 and configured to come into contact with the catching part 340 when the base 320 is turned, thereby restricting a turning angle and a turning radius of the base 320.

The stopper 120 includes a coupling portion 121 coupled to one side of the main body part 110 by coupling means such as bolting, welding, or riveting, and the bent portion 122 extending from one end of the coupling portion 121 so as to be bent in the direction wherein the base 320 is turned.

Therefore, according to the device for attaching and detaching tools in a magazine according to the present disclosure, the fixed position of the tool having directionality is accurately adjusted with respect to the magazine of the machine tool and then the tool is attached to or detached from the gripper, such that it is possible to prevent the tool from being placed at an incorrect tool position and thus to prevent the workpiece or the tool from being damaged during the machining. As a result, it is possible to reduce costs required to maintain the machine tool and maximize reliability and stability of the machine tool.

An operational principle of the device 1 for attaching and detaching tools in a magazine according to the exemplary embodiment of the present disclosure will be described with reference to FIGS. 5 to 8.

In this case, a clockwise direction and a counterclockwise direction are determined based on when viewed from the top of FIG. 7. That is, the arrow direction illustrated in FIG. 7 is the clockwise direction. However, FIG. 8 illustrates a state when viewing FIG. 7 from below, and the counterclockwise direction in FIG. 8 is the clockwise direction in FIG. 7.

The base 320 of the manipulation unit 300 is maintained at the exact position (a state wherein the base 320 is not turned) in a state wherein the tool 7 is fastened to the gripper 4. The positioning part 330 detects whether the base 320 is positioned at the exact position, and then the positioning part 330 transmits the detection result to a control unit of the machine tool.

In this case, since the base 320 is not turned, the first pressing portion 221 of the first gear 220 and the second pressing portion 241 of the second gear 240 do not press the fingers 5 of the gripper 4, and the gripper presses and clamps the tool with elastic force of the elastic member 6.

When it is necessary to replace or remove the tool 7 clamped by the corresponding gripper 4, the operator holds the handle 360 of the base 320 and then turns the base 320 clockwise, as illustrated in FIG. 7. In this case, the positioning part 330 may detect directionality of the tool by coming into contact with the tool groove 8 of the tool 7. In addition, during the turning of the base 320, the catching part 340 comes into contact with the bent portion 122 of the stopper 120 at the moment when the positioning part 330 comes into contact with the tool groove 8 of the tool 7, and thus the base 320 stops turning, such that the turning angle and the turning radius of the base 320 are automatically determined.

When the base 320 rotates clockwise, the connecting part 310 connected to the base 320 rotates clockwise at the same time, and the third rotary shaft 250 connected to the connecting part 310 rotates clockwise. In this case, the third gear 250 fitted with the third rotary shaft 250 rotates clockwise, and the second gear 240 engaging with the third gear 250 rotates counterclockwise. At the same time, the second rotary shaft 230 fitted with the second gear 240 also rotates counterclockwise, and the first gear 220 engaging with the second gear 240 rotates clockwise. In addition, at the same time, the first rotary shaft 210 fitted with the first gear 220 also rotates clockwise.

When the second gear 240 rotates counterclockwise and the first gear 220 rotates clockwise as described above, the second pressing portion 241 of the second gear 240 presses, at one side, the finger 5 of the gripper 4, and simultaneously, the first pressing portion 221 of the first gear 220 presses, at the other side, the finger 5 of the gripper 4. Then, the elastic member 6 of the gripper 4 is compressed, the gripper 4 is opened, and the tool 7 is unclamped. After the tool is unclamped, a tool to be inserted is inserted into the corresponding gripper 4, and the tool groove 8 and the positioning part 330 are brought into contact with each other. In this state, the handle 360 is rotated counterclockwise in the state wherein the tool having directionality is fixedly positioned in the corresponding gripper in an accurate direction.

When the handle 360 rotates counterclockwise, all of the above-mentioned components rotate in the directions opposite to the above-mentioned directions. Therefore, the first and second pressing portions do not press the fingers, such that the gripper 4 clamps the tool by the elastic member 6 in the state wherein the directionality of the tool is accurately adjusted.

Thereafter, the detection part 350 detects whether the base 320 is positioned at the exact position, and a subsequent operation is performed if there is no abnormality.

Accordingly, according to the device for attaching and detaching tools in a magazine according to the present disclosure, the fixed position of the tool having directionality is accurately adjusted with respect to the magazine of the machine tool, and then the tool is easily attached to or detached from each of the grippers of the magazine, by the operations of the first and second gears of the driving unit and the turning operation of the base of the manipulation unit. As a result, it is possible to improve precision when machining the workpiece, quickly adjust the fixed position of the tool, minimize the non-processing time, improve productivity, reliability, safety, and durability of the machine tool, improve the operator's convenience, and prevent a safety accident.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A device for attaching and detaching tools in a magazine, the device comprising:
 a housing unit having a main body part installed on a support frame of the magazine, wherein the magazine has a plurality of grippers and each of the plurality of grippers has fingers;
 a driving unit rotatably installed on the main body part and configured to apply pressure to the fingers or release the fingers; and
 a manipulation unit turnably installed on the main body part and configured to provide rotational power to the driving unit,
 wherein the device is capable of adjusting a fixed position of one of the tools to be clamped by one of the plurality of grippers corresponding to the one of the tools, while attaching or detaching the one of the tools to or from the one of the plurality of grippers by turning the manipulation unit,
 wherein the driving unit comprises:
 a first rotary shaft installed to be coupled to a part of the main body part;
 a first gear installed on the first rotary shaft and configured to rotate in a direction that is the same as a direction in which the manipulation unit is turned;
 a second rotary shaft installed on a part of the main body part so as to be in parallel with and spaced apart from the first rotary shaft; and
 a second gear installed on the second rotary shaft and configured to engage with the first gear and rotate in a direction opposite to the direction in which the first gear rotates,
 wherein the first gear comprises a first finger presser provided at a lower portion of the first gear and configured to press one finger of the fingers, and the second gear comprises a second finger presser portion provided at a lower portion of the second gear and configured to press the other finger of the fingers in conjunction with the first finger presser,
 wherein the driving unit further comprises:
 a third rotary shaft installed on a part of the main body part so as to be in parallel with and spaced apart from the first rotary shaft and the second rotary shaft; and
 a third gear installed on the third rotary shaft and configured to engage with the second gear and rotate in a direction opposite to the direction in which the second gear rotates.

2. The device of claim 1, wherein the manipulation unit comprises:
 a connector connected to the first rotary shaft or the third rotary shaft;
 a base installed to be coupled to the connector;
 a position adjuster provided at a lower portion of the base and configured to adjust a fixed position of the tool to be clamped by the fingers; and
 a catcher provided at the lower portion of the base so as to be spaced apart from the position adjuster and configured to restrict a turning angle of the base.

3. The device of claim 2, wherein the manipulation unit further comprises a base turning detector configured to detect whether the base is turned.

4. The device of claim 2, wherein the housing unit comprises a stopper installed at one side of the main body part and configured to restrict the turning angle of the base by coming into contact with the catcher when the base is turned.

5. The device of claim 4, wherein the stopper comprises:
 a coupler coupled to one side of the main body part; and
 a bend extending from one end of the coupler so as to be bent in a direction in which the base is turned.

* * * * *